May 31, 1955     E. W. PATTERSON     2,709,630
PISTON RING
Filed Dec. 8, 1953
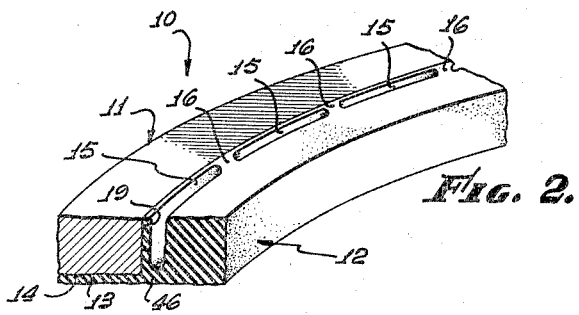
FIG. 2.
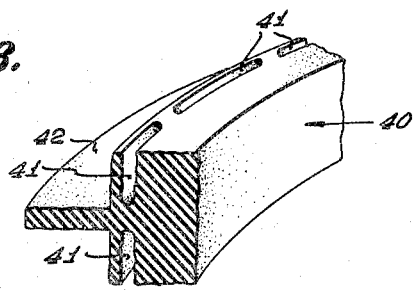
FIG. 5.
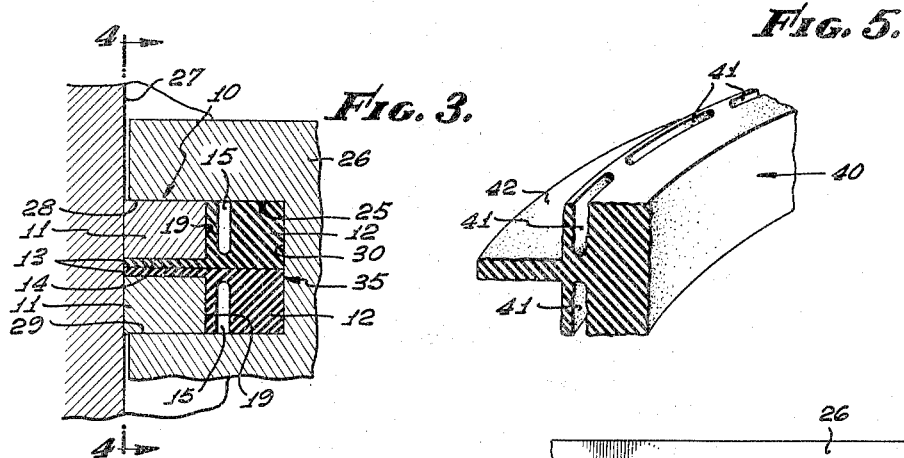
FIG. 3.
FIG. 4.
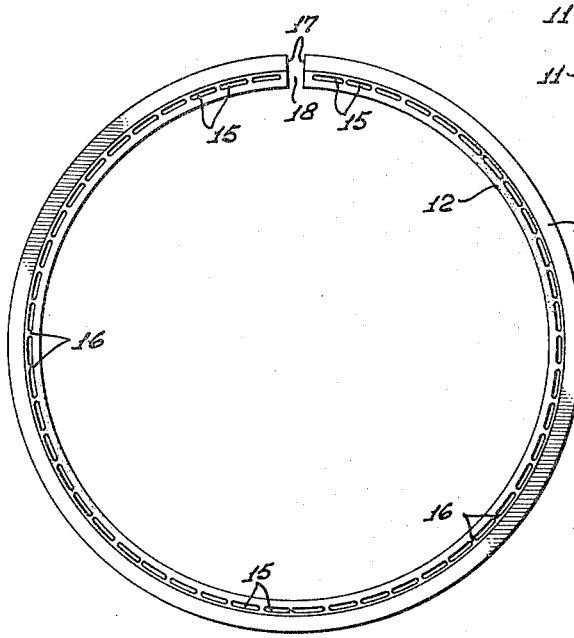
FIG. 1.
EDGAR W. PATTERSON
INVENTOR.
BY
ATTORNEY.

United States Patent Office 2,709,630
Patented May 31, 1955

2,709,630

PISTON RING

Edgar W. Patterson, Downey, Calif.

Application December 8, 1953, Serial No. 396,832

2 Claims. (Cl. 309—44)

This invention relates to piston rings and has as its particular object the provision of means for sealing off the gaps in a pair of juxtaposed cut piston rings.

It is customary practice to employ a pair of cut piston rings placed together with the respective gaps in the rings in offset relation, with the idea that a continuous portion of each ring will be disposed opposite the gap in the other ring and thus cause said gaps to be sealed and prevent the escape of fluid past the pair of rings thus related. This arrangement is found relatively effective in certain environments where fluid pressure is applied to the rings for only a brief moment at a time and is widely used in internal combustion engines.

Where fluid pressures of a high order are more constantly applied to piston rings, the mere juxtaposition of a pair of metal piston rings has been found to provide an inadequate seal against the leakage of fluid past the rings.

It is an object of the present invention to provide a cut metal piston ring having a sealing means associated therewith so that when two of these rings are placed together and inserted in the ring groove of the piston and then compressed in said groove to enable the rings to be inserted into a cylinder in which the piston is adapted to reciprocate, this sealing means will form a substantially fluid tight seal between the metal rings thereby preventing the escape of liquid past said rings by the passage of said fluid from the cylinder gap in one of said rings to the cylinder gap in the other of said rings.

It is yet another object of the invention to provide a piston ring having such a seal means which when a pair of such rings are placed together and inserted as above described in the piston groove, will not only prevent the escape of fluid past said rings by way of the gaps therein, but will also prevent the escape of fluid past said rings by the passage of said fluid around said rings and through said groove from the high pressure side of said groove to the low pressure side thereof.

A further object of the invention is to provide a piston ring having a seal means as aforesaid which seal means incorporates a pressure element which exerts a uniform expansive pressure against the metal ring, thereby pressing the latter against the cylinder wall.

A still further object is to provide such a seal means and pressure element in a single rubber member cast in coextensive bonded relation with each of the metal rings of a pair of the latter used in the invention, so that each metal ring and its rubber member constitutes a unit which can be inserted in a piston groove in the same manner as an ordinary cut metal ring is inserted.

It is another object of the invention to provide the seal means and pressure elements for a pair of metal rings in a single annular rubber member which is not bonded to said metal rings but which may be assembled in said piston groove with said metal rings and when so assembled in a cylinder performs the same sealing and pressure functions as above described for individual rubber members cast in bonded relation respectively with said metal rings.

The manner of accomplishing the foregoing objects as well as further objects and advantages will be made manifest in the following description taken in connection with the accompanying drawing in which Fig. 1 is a plan view of a preferred embodiment of the invention.

Fig. 2 is an enlarged fragmentary perspective view of the ring shown in Fig. 1.

Fig. 3 is a diagrammatic sectional view illustrating the manner in which two of the rings shown in Figs. 1 and 2 are placed back to back and inserted in the ring groove of a piston and the rings then compressed in said groove to cause them to be admitted into a cylinder in which the piston reciprocates.

Fig. 4 is a fragmentary diagrammatic elevational view of the pair of rings shown in Fig. 3 as these are held in the ring groove of said piston, Fig. 4 being taken in the cylindrical surface of the cylinder wall as indicated by line 4—4 in Fig. 3. This view illustrates the manner in which the gaps in the two rings are sealed off from each other by the present invention.

Fig. 5 is a fragmentary perspective view of a composite rubber ring comprising a modified form of the sealing and pressure means of the present invention.

Referring specifically to the drawings and particularly to Figs. 1, 2, 3 and 4, the invention is there shown as embodied in a piston ring 10 including a cut metal ring 11 having a rectangular cross-section and a rubber ring 12 also having a rectangular cross-section and disposed within the ring 11 and being bonded thereto and being substantially coextensive therewith. The rubber ring 12 has substantially the same radial thickness as the metal ring 11 but has a slightly greater axial thickness to provide a thin annular flange 13 which extends from the ring 12 radially outward alongside of and completely covering a radial face 14 of the metal ring 11.

The rubber ring 12 is molded to include a series of relatively deep and narrow cavities 15 which are spaced by short pressure bridges 16, the cavities 15 and bridges 16 being for purposes to be made clear hereinafter.

The ring 10 is manufactured by compressing the expansive metal ring 11 to bring together the abutting end faces 17 of the gap 18 therein, and inserting the ring 10 in a mold (not shown) which is shaped for molding the rubber ring 12 therein. The ring 12 is now formed and vulcanized in said mold so that said rubber ring is firmly bonded to the radial face 14 and inner face 19 of the metallic ring 11.

After the piston ring 10 has been formed thus by confining the ring 11 in said mold and forming the rubber ring 12 in said mold so that the latter is bonded to the metal ring 11, the piston ring 10 is removed from the mold and the rubber ring 12 is severed in the plane of the gap 18 of the metal ring 11 as shown in Fig. 1. This allows the ring 10 to expand as shown in this view with the end faces 17 of the ring 10 spaced apart and with the ring 10 in its normal expanded condition.

Rings 10 are preferably used in pairs, a pair of these being inserted, as shown in Fig. 3 in an annular ring groove 25 formed in a piston 26 which reciprocates in a cylinder 27. The groove 25 has radial side walls 28 and 29 and a cylindrical bottom wall 30. The ring 10 is so dimensioned that when two of these are placed back to back and inserted in the ring groove 25 the assembled pair of rings just fits snugly into the groove 25 and yet not too snugly to permit the ready expansion of the metal rings 11 against the wall of the cylinder 27 to maintain a sealing relationship between the rings and the cylinder.

When the two piston rings 10 are thus assembled together the gaps 18 in the two rings are offset from each other as shown in Fig. 4. Here it is seen that the rubber flange 13 of each of the respective piston rings 10 overlaps the gap 18 of the other ring so as to effectively seal off the space between these two rings which lies between the planes of the gaps 18 thereby preventing the passage of fluid from one of these gaps to the other gap incidental to the operation of the piston 26 in the cylinder 27.

The rubber rings 12 unite in action in the groove 25 to form an annular rubber sealing and pressure means 35 which fills groove 25, behind and between rings 11 and is compressible in said groove by virtue of its having the cavities 15 therein. Furthermore the rubber means 35 must be compressed so as to constrict the cavities 15 in order to get rings 10 into the cylinder 27, thus the rubber means 35 constantly exerts a pressure radially outwardly against the metallic rings 11 which pressure is added to the resilience of the rings 11 themselves and both tend to hold these rings in snug sealing relation with the wall of the cylinder 27. Because the annular rubber means 35 fills the space in the piston groove 25 behind the metal rings 11, it also blocks the passage of fluid around said rings and through the groove 25.

It is desired to point out that it is of special importance that the flanges 13 extend outwardly to the peripheries of the metal rings 11 so that said flanges may be said to be "co-radial" with said metal rings. Only when thus co-radial with the metal rings 11 do the rubber flanges 13 seal the gaps 18 in the rings 11 and keep fluid from flowing circumferentially from one of these gaps to the other.

While it is preferable to embody the invention in individual piston rings 10 which include both a metal ring 11 and a rubber ring 12 bonded thereto, the sealing and pressure means 35 of the invention may also be embodied in a single rubber annulus 40 which may be cut or not as desired, because if it is not cut, it can be stretched over the piston 26 and allowed to contract into place in the groove 25. The rubber annulus 40 has cavities 41 formed therein, which are identical to the cavities 15 in the rubber rings 12, and also has a flange 42, the annulus 40 being dimensioned so as to duplicate in a single rubber body what would be produced by placing two of the rubber rings 12 back to back as shown in Fig. 3, but unconstrained, and cementing the same together.

The rubber annulus 40, however, is not bonded to the metal rings 11 as is the case with the rubber rings 12 but is separate from said rings and is separately installed in the piston groove 25. After the rubber annulus 40 has been so installed, a pair of cut metal rings identical with the metal rings 11 are slipped over the piston 26 and allowed to contract in the groove 25 on opposite sides of the rubber flange 42. The latter flange, of course, is co-radial with the separate metal rings 11 which may be thus associated therewith, and performs the same sealing function, above described, that the two rubber flanges 13 perform when two piston rings 10 are assembled together in groove 25 as shown in Figs. 3 and 4.

As shown in Fig. 3 the relative dimensions of the rings 10 and the piston ring groove 25 are such that the rubber rings 12 are compressed to cause a reduction in their radial thickness when inserting the rings 10 into said groove so as to permit said rings to slip inside the cylinder wall 27. The material of which the ring 12 is made being incompressible, the decrease in the radial thickness of this ring is effected by the constriction of the cavities 15 which is effected by a distortion of the rubber bridges 16 between adjacent cavities 15 and the relatively thin bottom walls 46 of said cavities (Fig. 2).

The relative areas of the cavities 15 and of the bridges 16 and cavity bottom walls 17 are selected in the design of the piston rings 10 so that exactly that resistance to distortion will be offered by the bridges 16 and cavity bottom walls 46 as to set up a desired radial pressure exerted constantly outwardly by the sealing and pressure means 35 against the metal rings 11 as to supplement the expansive resilience of the metal rings themselves, by an amount necessary to assure good sealing contact between the metal rings and the cylinder wall 27.

This outward pressure of the cavity bottom walls 46 is exerted mainly against the rubber of the flanges 13 causing a radial flow of said rubber outwardly from the axis of the piston 26 thereby assuring a snug sliding contact of the outer edges of the rubber flanges 13 with the cylinder wall 27. This causes flanges 13 to always effect the desired seal between the gaps 18 in the two piston rings 10 as illustrated in Fig. 4 and above described.

When the annular sealing and pressure means 35 is replaced by the correspondingly shaped annulus 40 in association with a pair of free metal rings 11, that is which are not bonded to the annulus 40, the latter functions in practically the same manner as above described for the means 35 in providing a constant outward pressure against such metal rings and in sealing the gaps in said rings from communication with each other and in causing a radial flow of the rubber in the flange 42 so as to maintain the periphery of this in constant sealing contact with the cylinder wall 27.

The preferred way of practicing the invention is to make the rings 10 as shown in Figs. 1, 2, 3 and 4 with a rubber ring 12 molded in bonded relation with a metal ring 11. This form of the invention has the merit of disposing of any necessity of handling the sealing and pressure means of the invention apart from the metal rings and embodies said sealing and pressure means with the metal rings so that all that needs to be done to install the invention is to place two of the rings 10 back to back and insert them in place in a piston ring groove 25 and then compress the rings 10 to reduce their outside diameter to where they can be inserted into the cylinder 27.

Care must be taken, in installing the piston rings 10 in a piston groove 25, not to fill the cavities 15 with oil or other liquid as this of course renders the rings 12 incompressible and prevents the contraction of the rings 10 to where they will fit into the cylinder 27. After the rings 10 have been inserted in place in a piston ring groove 25 as shown in Fig. 3 lubricant may gain admittance to the constricted cavities 15 of the upper piston ring 10 but the cavities 15 in the lower piston ring remain filled with air so that a sufficient degree of the expansive resiliency of the sealing and pressure means 35 of the invention is retained throughout the operation of the invention, to make this function properly in adapting the rings 11 to inequalities in the cylinder wall 27.

The admission of oil into the upwardly disposed cavities 15 after a pair of piston rings 10 has been installed in a piston groove 25 does not diminish the distortion already imparted to the rubber bridges 16 and cavity bottom walls 46 when the piston rings 10 were installed. Thus, cavity bridges 16 and bottom walls 46 will continue to exert the same expansive pressure radially outward against the metal rings 11 after the upwardly disposed cavities 15 are filled with liquid as before this happens.

The term "rubber" as used herein refers to natural rubber or any of the various synthetic rubbers which are suitable for use in the present invention under the various conditions in which this may operate. Experience with the invention in actual use indicates that a synthetic rubber highly resistant to deterioration by the presence of lubricating oil or high temperatures is preferable as the material for the rings 12 or the annulus 40. Material of this character is obtainable under the trade names "Neoprene" or "Duprene" and a durometer hardness of approximately 70 in this rubber has been found generally satisfactory.

The claims are:

1. A piston ring adapted to be employed in pairs in an external annular groove with parallel radial side walls in a metallic piston to form a seal between said piston and a cylinder in which said piston reciprocates, said piston ring comprising: a cut metal ring; and a soft rubber ring disposed radially within and co-extensive in length with said metal ring and bonded to the latter, said rubber ring having a flange extending radially therefrom said flange covering one of the radial faces of said metal ring and being bonded thereto, said rubber ring having an axial thickness substantially equal to said metal ring plus the thickness of said flange, said rubber ring being provided with a series of circumferentially spaced cavities molded therein throughout its length to permit a reduction in the volume occupied by said rubber ring by the compression of the latter in said groove by the contraction of said metal ring in fitting the latter within a cylinder in which said piston is adapted to reciprocate.

2. A device for sealing the space between a pair of cut metal rings and permitting said rings to fit into an external annular groove with parallel radial side walls in a metallic piston and form a seal between said piston and a cylinder within which said piston reciprocates, said device comprising: an annular rubber means formed to substantially fill the space in said groove behind said pair of metal rings and to conform outwardly to said metal rings when the latter are installed in said groove and in said cylinder; and rubber flange means extending radially outwardly from said annular rubber means and integral with the latter, said rubber flange means lying between said split metal rings when the latter are so installed in said groove and cylinder, said flange means being co-radial with said metal rings when the latter are operatively installed in said groove and confined within said cylinder, said annular rubber means being provided with a series of cavities molded therein in spaced relation and opening axially from opposite radial faces thereof to invest said annular rubber means with an expansive capacity maintaining said annular rubber means in snug conformity with said groove and exerting an expansive force radially against said metal rings.

References Cited in the file of this patent
UNITED STATES PATENTS

| | | |
|---|---|---|
| Re. 23,782 | Patterson | Feb. 16, 1954 |
| 542,137 | Braden | July 2, 1895 |
| 2,446,224 | Frisby et al. | Aug. 3, 1948 |
| 2,472,540 | Meador | June 7, 1949 |